United States Patent
Tsai et al.

(10) Patent No.: US 7,715,460 B2
(45) Date of Patent: May 11, 2010

(54) HYBRID ORTHOGONAL FREQUENCY DIVISION MULTIPLE ACCESS SYSTEM AND METHOD

(75) Inventors: Yingming Tsai, Boonton, NJ (US); Guodong Zhang, Farmingdale, NY (US); Jung-Lin Pan, Selden, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 596 days.

(21) Appl. No.: 11/406,878

(22) Filed: Apr. 19, 2006

(65) Prior Publication Data

US 2006/0256839 A1  Nov. 16, 2006

Related U.S. Application Data

(60) Provisional application No. 60/673,872, filed on Apr. 22, 2005.

(51) Int. Cl.
*H04B 1/00* (2006.01)
*H04K 1/10* (2006.01)

(52) U.S. Cl. ........................... 375/131; 375/260
(58) Field of Classification Search ........... 375/132, 375/138, 260, 267, 299, 340, 342, 346–350, 375/131; 370/208, 210
See application file for complete search history.

(56) References Cited

U.S. PATENT DOCUMENTS

| 6,754,169 | B2 | 6/2004 | Baum et al. |
| 6,795,424 | B1 | 9/2004 | Kapoor et al. |
| 7,016,649 | B1 * | 3/2006 | Narasimhan et al. ........ 455/63.1 |
| 7,397,839 | B2 * | 7/2008 | Maeda et al. ................ 375/141 |
| 2003/0081538 | A1 | 5/2003 | Walton et al. |
| 2004/0174812 | A1 * | 9/2004 | Murakami et al. .......... 370/215 |
| 2006/0262871 | A1 | 11/2006 | Cho et al. |
| 2007/0030883 | A1 * | 2/2007 | Saidi ........................ 375/133 |
| 2007/0263735 | A1 * | 11/2007 | Tong et al. .................. 375/260 |

FOREIGN PATENT DOCUMENTS

RU  2323535  3/2006

* cited by examiner

*Primary Examiner*—Khanh C Tran
(74) *Attorney, Agent, or Firm*—Volpe and Koenig, P.C.

(57) ABSTRACT

A hybrid orthogonal frequency division multiple access (OFDMA) system including a transmitter and a receiver is disclosed. The transmitter includes a first spread OFDMA subassembly, a first non-spread OFDMA subassembly and a first common subassembly. The first spread OFDMA subassembly spreads input data and maps the spread data to a first group of subcarriers. The first non-spread OFDMA subassembly maps input data to a second group of subcarriers. The first common subassembly transmits the input data mapped to the first and second group of subcarriers using OFDMA. The receiver includes a second spread OFDMA subassembly, a second non-spread OFDMA subassembly and a second common subassembly. The second common subassembly processes received data to recover data mapped to the subcarriers using OFDMA. The second spread OFDMA subassembly recovers the first input data by separating user data in a code domain and the second non-spread OFDMA subassembly recovers the second input data.

24 Claims, 3 Drawing Sheets

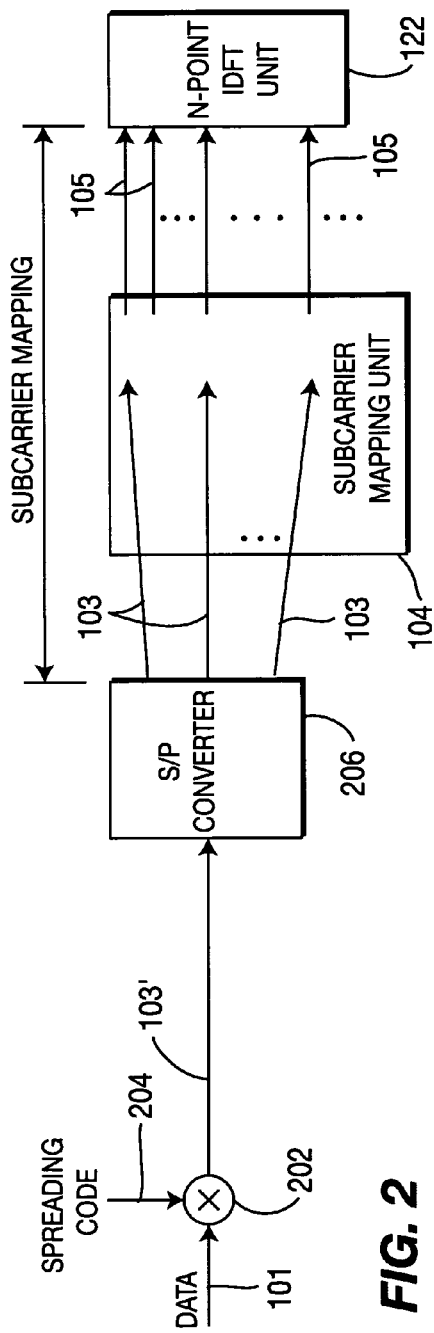
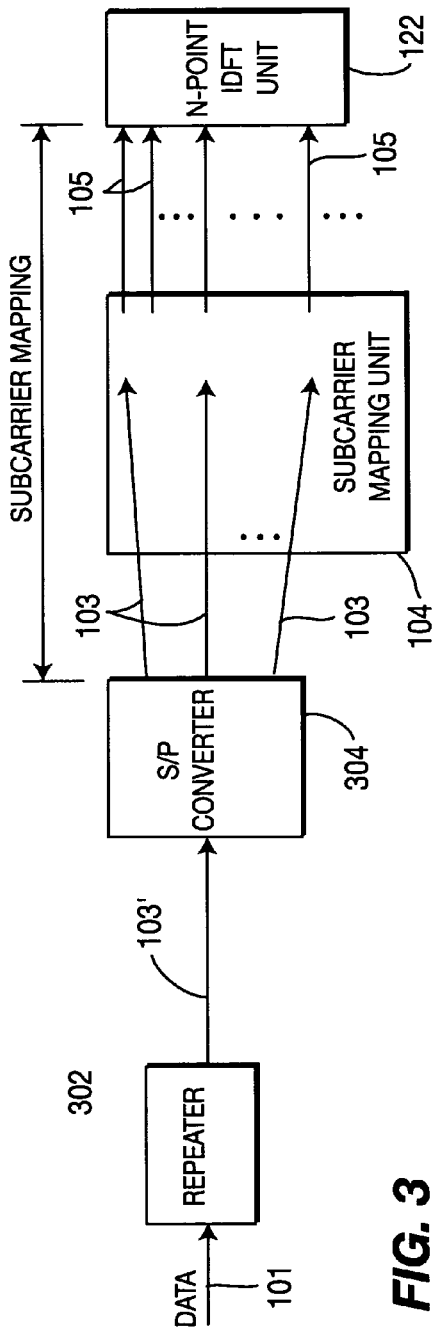
FIG. 2
FIG. 3

HYBRID ORTHOGONAL FREQUENCY DIVISION MULTIPLE ACCESS SYSTEM AND METHOD

CROSS REFERENCE TO RELATED APPLICATION

This application claims the benefit of U.S. Provisional Application No. 60/673,872 filed Apr. 22, 2005, which is incorporated by reference as if fully set forth.

FIELD OF INVENTION

The present invention is related to wireless communication systems. More particularly, the present invention is related to a hybrid orthogonal frequency division multiple access (OFDMA) system and method.

BACKGROUND

It is expected that future wireless communication systems will provide broadband services such as wireless Internet access to subscribers. Such broadband services require reliable and high throughput transmissions over a wireless channel which is time dispersive and frequency selective. The wireless channel is subject to limited spectrum and inter-symbol interference (ISI) caused by multipath fading. Orthogonal frequency division multiplexing (OFDM) and OFDMA are some of the most promising solutions for next generation wireless communication systems.

OFDM has a high spectral efficiency since the subcarriers used in the OFDM system overlap in frequency and an adaptive modulation and coding scheme (MCS) may be employed across subcarriers. In addition, implementation of OFDM is very simple because the baseband modulation and demodulation are performed by simple inverse fast Fourier transform (IFFT) and fast Fourier transform (FFT) operations. Other advantages of the OFDM system include a simplified receiver structure and excellent robustness in a multipath environment.

OFDM and OFDMA have been adopted by several wireless/wired communication standards, such as digital audio broadcast (DAB), digital audio broadcast terrestrial (DAB-T), IEEE 802.11a/g, IEEE 802.16, asymmetric digital subscriber line (ADSL) and is being considered for adoption in third generation partnership project (3GPP) long term evolution (LTE), cdma2000 evolution, a fourth generation (4G) wireless communication system, IEEE 802.11n, or the like.

One key problem with OFDM and OFDMA is that it is difficult to mitigate or control inter-cell interference to achieve a frequency reuse factor of one. Frequency hopping and subcarrier allocation cooperation between cells have been proposed to mitigate inter-cell interference. However, the effectiveness of both methods is limited.

SUMMARY

The present invention is related to a hybrid OFDMA system and method. The system includes a transmitter and a receiver. The transmitter includes a first spread OFDMA subassembly, a first non-spread OFDMA subassembly and a first common subassembly. The first spread OFDMA subassembly spreads input data and maps the spread data to a first group of subcarriers. The first non-spread OFDMA subassembly maps input data to a second group of subcarriers. The first common subassembly transmits the input data mapped to the first group of subcarriers and the second group of subcarriers using OFDMA. The receiver includes a second spread OFDMA subassembly, a second non-spread OFDMA subassembly and a second common subassembly. The second common subassembly of the receiver processes received data to recover data mapped to the subcarriers using OFDMA. The second spread OFDMA subassembly recovers the first input data by separating user data in a code domain and the second non-spread OFDMA subassembly recovers the second input data.

BRIEF DESCRIPTION OF THE DRAWINGS

FIG. 2 shows an example of frequency domain spreading and subcarrier mapping in accordance with the present invention.

FIG. 3 shows another example of spreading and subcarrier mapping in accordance with the present invention.

DETAILED DESCRIPTION OF THE PREFERRED EMBODIMENTS

Hereafter, the terminology "transmitter" and "receiver" includes but are not limited to a user equipment (UE), a wireless transmit/receive unit (WTRU), a mobile station, a fixed or mobile subscriber unit, a pager, a Node-B, a base station, a site controller, an access point or any other type of device capable of operating in a wireless environment.

The features of the present invention may be incorporated into an integrated circuit (IC) or be configured in a circuit comprising a multitude of interconnecting components.

The present invention is applicable to any wireless communication system that utilizes OFDMA (or OFDM) and/or code division multiple access (CDMA), such as IEEE 802.11, IEEE 802.16, third generation (3G) cellular systems, 4G systems, satellite communication systems, or the like.

Figure 1:
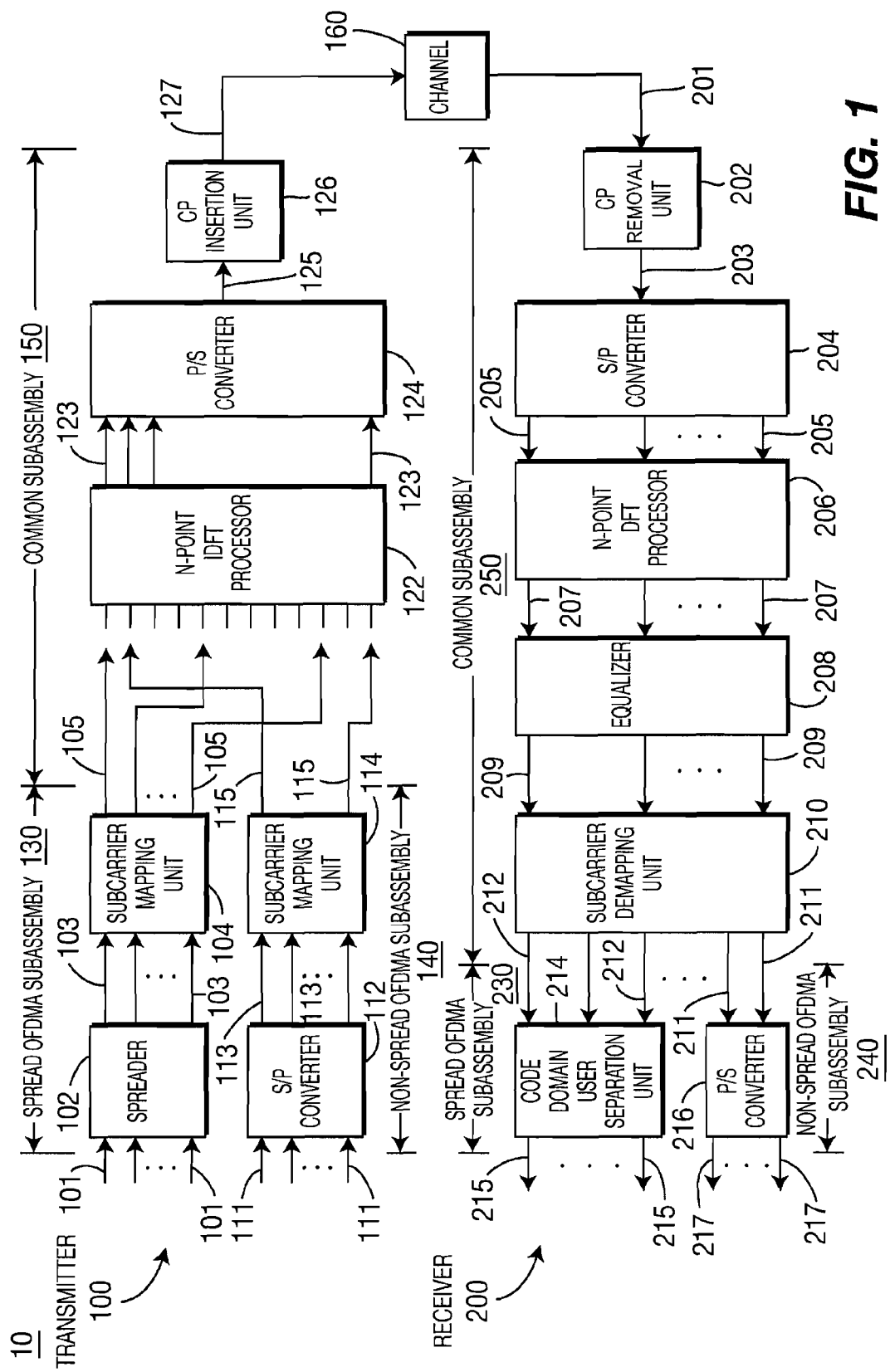
FIG. 1 is a block diagram of an exemplary hybrid OFDMA system configured in accordance with the present invention.

FIG. 1 is a block diagram of an exemplary hybrid OFDMA system 10 including a transmitter 100 and a receiver 200 in accordance with the present invention. The transmitter 100 includes a spread OFDMA subassembly 130, a non-spread OFDMA subassembly 140 and a common subassembly 150. In the spread OFDMA subassembly 130, input data 101 (for one or more users) is spread with a spreading code to generate a plurality of chips 103 and the chips 103 are then mapped to subcarriers. In the non-spread OFDMA subassembly 140, input bit 111 (for one or more different users) is mapped to subcarriers without spreading.

The spread OFDMA subassembly 130 includes a spreader 102 and a first subcarrier mapping unit 104. The non-spread OFDMA subassembly 140 includes a serial-to-parallel (S/P) converter 112 and a second subcarrier mapping unit 114. The common subassembly 150 includes an N-point inverse discrete Fourier transform (IDFT) processor 122, a parallel-to-serial (P/S) converter 124 and a cyclic prefix (CP) insertion unit 126.

Assuming that there are N subcarriers in the system and that K different users communicate at the same time in the system, among K users, data to Ks users is transmitted via the spread OFDMA subassembly 130. The number of subcarriers used in the spread OFDMA subassembly 130 and the non-spread OFDMA subassembly 140 are $N_s$ and $N_o$, respectively. The values of $N_s$ and $N_o$ satisfy the conditions that $0 \leq N_s \leq N$, $0 \leq N_o \leq N$, and $N_s + N_o \leq N$.

The input data 101 is spread by the spreader 102 to a plurality of chips 103. The chips 103 are mapped to the $N_s$ subcarriers by the subcarrier mapping unit 104. The spreading may be performed in the time domain, in the frequency domain, or both. For a particular user, spreading factors in the time domain and the frequency domain are denoted by $SF_t$ and $SF_f$, respectively. A joint spreading factor for the user is denoted by $SF_{joint}$, which equals to $SF_t \times SF_f$. When $SF_t=1$, the spreading is performed only in the frequency domain, and when $SF_f=1$, the spreading is performed only in the time domain. A frequency domain spreading for user i is limited to the number of subcarriers allocated to the user i, $N_s(i)$. The allocation of subcarriers can be static or dynamic. In the case where $N_s(i)=N_s$ for every user i, the spread OFDMA becomes spread OFDM.

One subcarrier may be mapped to more than one user in the spread OFDMA subassembly 130. In such case input data 101 of two or more users mapped to the same subcarrier are code multiplexed, and therefore, should be spread using different spreading codes. If spreading is performed both in the time and frequency domain, spreading codes assigned to users may be different in the time domain, in the frequency domain, or both.

FIG. 2 shows an example of frequency domain spreading and subcarrier mapping in accordance with the present invention. The input data 101 is multiplied with a spreading code 204 by a multiplier 202 to generate a plurality of chips 103'. The chips 103' are converted to parallel chips 103 by an S/P converter 206. Each of the parallel chips 103 is then mapped to one of the subcarriers by the subcarrier mapping unit 104 before being sent to the IDFT processor 122.

FIG. 3 shows another example of frequency domain spreading and subcarrier mapping in accordance with the present invention. Instead of multiplying a spreading code by a spreader, a repeater 302 may be used to repeat each input data 101 multiple times at the chip rate to generate chips 103'. The chips 103' are then converted to parallel chips 103 by an S/P converter 304. Each of the parallel chips 103 is mapped to one of the subcarriers by the subcarrier mapping unit 104 before being sent to the IDFT processor 122.

Alternatively, when input data is spread in the time domain, each input data is spread by a spreader to generate a plurality of chip streams and the chip streams are mapped to subcarriers. In such case, the time domain spreading may also be performed by simple repetition of the input data without using a spreading code.

Common pilots may be transmitted on the subcarriers used in the spread OFDMA subassembly 130. In order to distinguish from other user data, common pilots are also spread.

Referring again to FIG. 1, in the non-spread OFDMA subassembly 140, input bits 111 of different users are converted to parallel bits 113 by the S/P converter 112. The subcarrier mapping unit 114 allocates users to one or more subcarriers, such that each subcarrier is used by at most one user and bits from each user are mapped to the allocated subcarriers for the user by the subcarrier mapping unit. In this way, users are multiplexed in the frequency domain. The number of subcarriers allocated to user i is denoted by $N_o(i)$, $0 \leq N_o(i) \leq N_o$. The allocation of subcarriers can be static or dynamic.

In accordance with the present invention, time-frequency hopping may be performed for the non-spread OFDMA subassembly 140 in a pseudo-random way in each cell. With time domain hopping, the users that transmit in a cell change from time to time, (i.e., over one or several OFDM symbols or frames). With frequency domain hopping, subcarriers allocated to users that transmit in a cell are hopping per one or several OFDM symbols or frames. In this way, the inter-cell interference can be mitigated and averaged among the users and cells.

Figure 4:
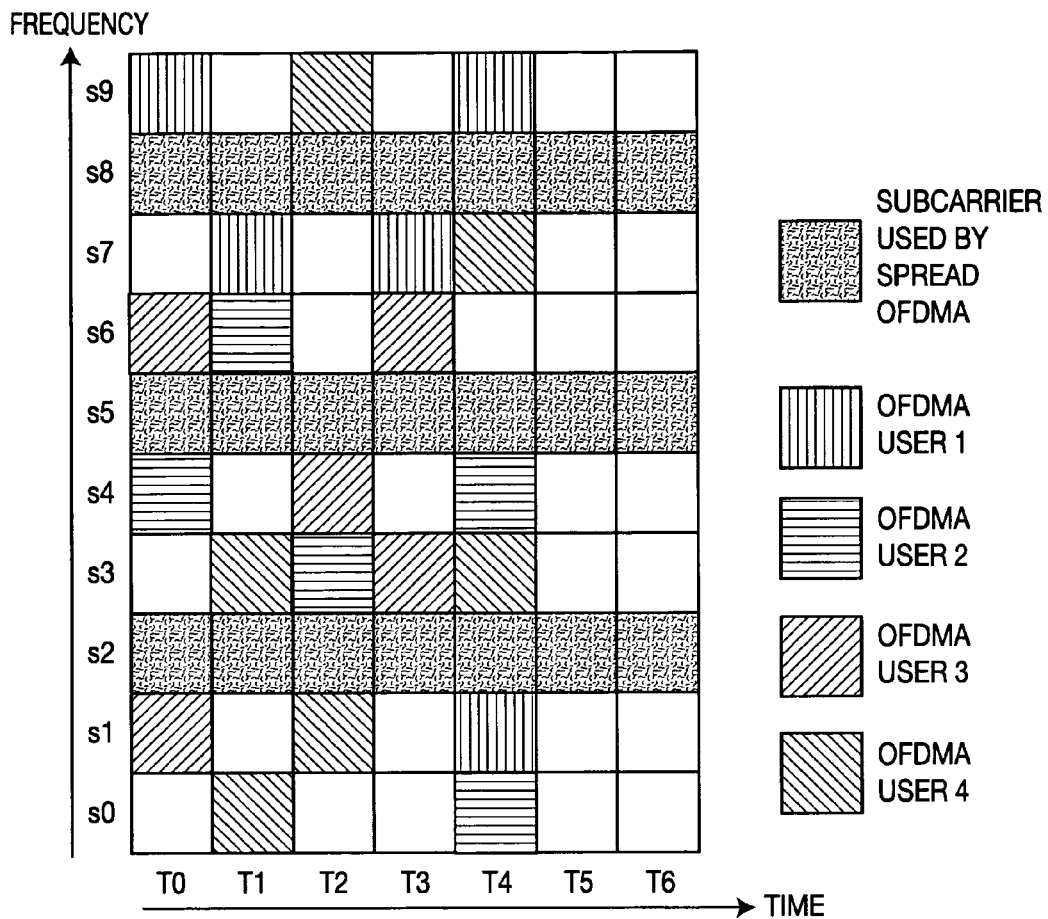
FIG. 4 shows an example of time-frequency hopping of subcarriers in accordance with the present invention.

FIG. 4 illustrates an example of time-frequency hopping where ten (10) subcarriers, s0-s9, are used for time periods of T0-T6 in accordance with the present invention. As an example, in FIG. 2, subcarriers s3, s5, s8 are used for spread OFDMA and the remaining subcarriers are used for non-spread OFDMA. For the subcarriers allocated for non-spread OFDMA, subcarriers and time periods allocated to users are hopping in a pseudo-random way. For example, data for user 1 is transmitted via s9 at T0, s7 at T1, s7 at T3, and s1 and s9 at T4, and data for user 2 is transmitted via s4 at T0, s6 at T1, s3 at T2, s0 and s4 at T4. Therefore, data to different users is transmitted over different OFDM symbols or frames and inter-cell interference is mitigated.

Referring again to FIG. 1, both the chips 105 and the data 115 are fed into the IDFT processor 122. The IDFT processor 122 converts the chips 105 and data 115 to time domain data 123. The IDFT may be implemented by IFFT or an equivalent operation. The time domain data 123 is then converted to a serial data 125 by the P/S converter 124. A CP, (also known as a guard period (GP)), is then added to the serial data 125 by the CP insertion unit 126. Data 127 is then transmitted via the wireless channel 160.

The receiver 200 includes a spread OFDMA subassembly 230, a non-spread OFDMA subassembly 240 and a common subassembly 250 for hybrid OFDMA. The common subassembly 250 includes a CP removal unit 202, a P/S converter 204, an N-point discrete Fourier transform (DFT) processor 206, an equalizer 208 and a subcarrier demapping unit 210. The spread OFDMA subassembly 230 includes a code domain user separation unit 214 and the non-spread OFDMA subassembly 240 includes a P/S converter 216.

The receiver 200 receives data 201 transmitted via the channel. A CP is removed from received data 201 by the CP removal unit 202. Data 203 after the CP is removed, which is time domain data, is converted to parallel data 205 by the S/P converter 204. The parallel data 205 is fed to the DFT processor 206 and converted to frequency domain data 207, which means N parallel data on N subcarriers. The DFT may be implemented by FFT or equivalent operation. The frequency domain data 207 is fed to the equalizer 208 and equalization is performed to data at each subcarrier. As in a conventional OFDM system, a simple one-tap equalizer may be used.

After equalization at each subcarrier, data corresponding to a particular user is separated by the subcarrier demapping unit 210, which is an opposite operation performed by the subcarrier mapping units 104, 114 at the transmitter 100. In the non-spread OFDMA subassembly 240, each user data 211 is simply converted to a serial data 217 by the S/P converter 216. In the spread OFDMA subassembly 230, data 212 on the separated subcarriers are further processed by the code domain user separation unit 214. Depending on the way spreading is performed at the transmitter 100 corresponding user separation is performed in the code domain user separation unit 214. For example, if the spreading is performed only in the time domain at the transmitter 100, a conventional Rake combiner may be used as the code domain user separation unit 214. If the spreading is performed only in the frequency domain at the transmitter 100, a conventional (frequency domain) despreader may be used as the code domain user separation unit 214. If the spreading is performed in both the time domain and the frequency domain at the transmitter 100, a time-frequency Rake combiner may be used as the code domain user separation unit 214.

Figure 5:
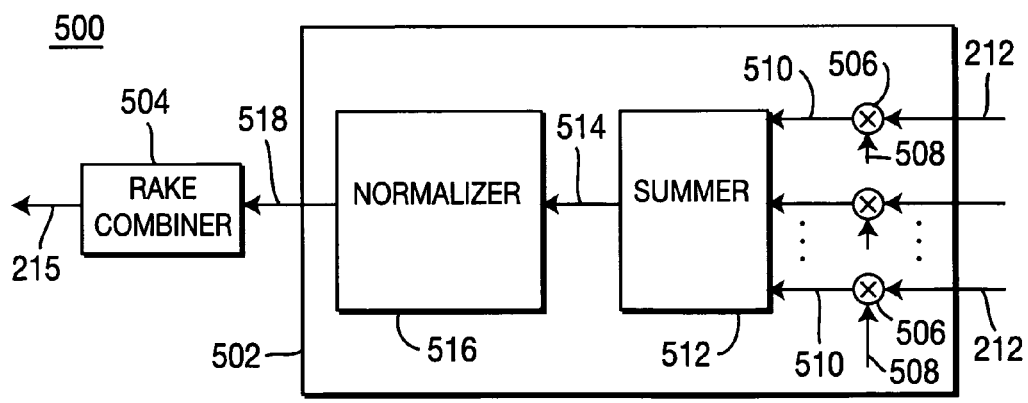
FIG. 5 is a block diagram of an exemplary time-frequency Rake combiner configured in accordance with the present invention.

FIG. 5 is a block diagram of an exemplary time-frequency Rake combiner 500 configured in accordance with the present invention. The time-frequency Rake combiner 500 performs processing at both time and frequency domains in order to recover data that is spread in both time and frequency domains at the transmitter 100. It should be noted that the time-frequency Rake combiners 500 may be implemented in many different ways and the configuration shown in FIG. 5 is provided as an example, not as a limitation, and the scope of the present invention is not limited to the structure shown in FIG. 5.

The time-frequency Rake combiner 500 comprises a despreader 502 and a Rake combiner 504. Data 212 separated and collected for a particular user by the subcarrier demapping unit 210 in FIG. 1 for the spread OFDMA subassembly 230 is forwarded to the despreader 502. The despreader 502 performs frequency-domain despreading to the data 212 on the subcarriers. The despreader 502 includes a plurality of multipliers 506 for multiplying conjugate 508 of the spreading codes to the data 212, a summer 512 for summing the multiplication outputs 510, and a normalizer 516 for normalizing the summed output 514. The despreader output 518 is then processed by the Rake combiner 504 to recover the data of the user by time domain combining.

Referring again to FIG. 1, the transmitter 100, the receiver 200, or both may include multiple antennas and may implement hybrid OFDMA in accordance with the present invention with multiple antennas either at transmitter side, the receiver side, or both.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A wireless transmit/receive unit (WTRU) configured to perform hybrid orthogonal frequency division multiple access (OFDMA) communications comprising:
   a receiver configured to receive hybrid OFDMA symbols, where the hybrid OFDMA symbols include multi-user spread input data on a first group of subcarriers and non-spread input data on a second group of subcarriers;
   the receiver configured to process the received hybrid OFDMA symbols to recover single-user spread input data from the multi-user spread input data on the first group of subcarriers and the non-spread input data from the second group of subcarriers;
   the receiver comprising:
   a spread OFDMA subassembly configured to recover single-user input data from the multi-user spread input data by performing code domain user separation; and
   a non-spread OFDMA subassembly configured to recover second input data from the non-spread input data.

2. The WTRU of claim 1 wherein the multi-user spread input data is spread in at least one of a time-domain or a frequency domain.

3. The WTRU of claim 1 wherein the multi-user spread input data is spread by repeating the single-user input data at a chip rate.

4. The WTRU of claim 1 wherein the spread OFDMA subassembly is configured to recover common pilots transmitted on the first group of subcarriers.

5. The WTRU of claim 1 wherein the non-spread OFDMA subassembly implements at least one of time-domain hopping or frequency-domain hopping in demapping the second input data from the second group of subcarriers.

6. The WTRU of claim 1 wherein the spread OFDMA subassembly comprises a Rake combiner.

7. The WTRU of claim 1 wherein the spread OFDMA subassembly comprises a time-frequency Rake combiner.

8. The WTRU of claim 1 wherein the receiver comprises multiple antennas.

9. The WTRU of claim 1 configured as a User Equipment (UE).

10. A method for hybrid orthogonal frequency division multiple access (OFDMA) communications in a wireless transmit/receive unit (WTRU), the method comprising:
    receiving hybrid OFDMA symbols, where the hybrid OFDMA symbols include multi-user spread input data on a first group of subcarriers and non-spread input data on a second group of subcarriers;
    processing the received hybrid OFDMA symbols to recover single-user spread input data from the multi-user spread input data on the first group of subcarriers and the non-spread input data from the second group of subcarriers;
    recovering single-user input data from the multi-user spread input data by performing code domain user separation; and
    recovering second input data from the non-spread input data.

11. The method of claim 10 wherein the multi-user spread input data is spread in at least one of a time-domain or a frequency domain.

12. The method of claim 10 wherein the multi-user spread input data is spread by repeating the single-user input data at a chip rate.

13. The method of claim 10 further comprising recovering common pilots on the first group of subcarriers.

14. The method of claim 10 wherein at least one of time-domain hopping or frequency-domain hopping is performed in demapping the second input data from the second group of subcarriers.

15. The method of claim 10 further comprising separating the spread input data with a Rake combiner.

16. The method of claim 10 further comprising separating the spread input data within a code domain using a time-frequency Rake combiner.

17. The method of claim 10 performed by a User Equipment (UE).

18. A Node-B configured to perform hybrid orthogonal frequency division multiple access (OFDMA) communications comprising:
    a transmitter comprising:
    a spread OFDMA subassembly configured to spread multi-user input data to generate multi-user spread input data;
    the spread OFDMA subassembly configured to map the multi-user spread input data to a first group of subcarriers;
    a non-spread OFDMA subassembly configured to map non-spread input data to a second group of subcarriers; and
    the transmitter being configured to transmit the multi-user spread input data and the non-spread input data over the first group of subcarriers and second groups of subcarriers, respectively, as part of hybrid OFDMA symbols transmission.

19. The Node-B of claim 18 wherein the spread OFDMA subassembly spreads the multi-user input data in at least one of a time-domain or a frequency domain.

20. The Node-B of claim 18 wherein the spread OFDMA subassembly spreads the multi-user input data by repeating single-user input data at a chip rate.

21. The Node-B of claim 18 wherein the spread OFDMA subassembly and the non-spread OFDMA subassembly maps the first group of subcarriers and the second group of subcarriers dynamically.

22. The Node-B of claim 18 wherein the spread OFDMA subassembly transmits common pilots on the first group of subcarriers.

23. The Node-B of claim 18 wherein the non-spread OFDMA subassembly implements at least one of time-domain hopping or frequency-domain hopping in mapping the second input data to the second group of subcarriers.

24. The Node-B of claim 18 wherein the transmitter comprises multiple antennas.

* * * * *